US007726125B2

(12) United States Patent
Brinkman et al.

(10) Patent No.: US 7,726,125 B2

(45) Date of Patent: Jun. 1, 2010

(54) HYDRAULIC CIRCUIT FOR RAPID BUCKET SHAKE OUT

(75) Inventors: Jason L. Brinkman, Peoria, IL (US); Jeffrey L. Kuehn, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 471 days.

(21) Appl. No.: 11/882,249

(22) Filed: Jul. 31, 2007

(65) Prior Publication Data

US 2009/0031891 A1 Feb. 5, 2009

(51) Int. Cl.
*F16D 31/02* (2006.01)

(52) U.S. Cl. ........................................................ 60/452

(58) Field of Classification Search .................. 60/445, 60/446, 452

See application file for complete search history.

(56) References Cited

U.S. PATENT DOCUMENTS

| | | | | |
|---|---|---|---|---|
| 4,463,558 | A | 8/1984 | Miller et al. | |
| 5,235,809 | A | 8/1993 | Farrell | |
| 5,765,594 | A | 6/1998 | Collins et al. | |
| 5,993,168 | A * | 11/1999 | Erkkilae et al. | 60/452 |
| 6,029,445 | A | 2/2000 | Lech | |
| 6,082,107 | A * | 7/2000 | Schniederjan et al. | 60/452 |
| 6,725,105 | B2 | 4/2004 | Francis et al. | |
| 6,757,992 | B1 | 7/2004 | Berger et al. | |
| 6,763,661 | B2 | 7/2004 | Tabor et al. | |
| 7,415,822 | B1 * | 8/2008 | Harber et al. | 60/452 |
| 2006/0099081 | A1 | 5/2006 | Toda et al. | |
| 2007/0039457 | A1 | 2/2007 | Vigholm et al. | |

* cited by examiner

*Primary Examiner*—Michael Leslie
(74) *Attorney, Agent, or Firm*—Finnegan, Henderson, Farabow, Garrett & Dunner

(57) ABSTRACT

A hydraulic circuit is disclosed. The hydraulic circuit may have a variable displacement pump. The variable displacement pump may have a fluidic displacement control configured to vary a flow of pressurized fluid based on a fluid signal and an electronic displacement control configured to vary the flow of pressurized fluid based on an electronic signal. The flow of pressurized fluid may be controlled by the one of the fluidic and electronic displacement controls that requests the smallest flow of pressurized fluid. The hydraulic circuit may also have a control valve connected between the pump and the fluidic displacement control, and the control valve may be configured to transmit the fluid signal to the fluidic displacement control. The hydraulic circuit may further have a controller configured to transmit a fluid signal to cause the fluidic control to request a maximum flow of pressurized fluid, and transmit an electronic signal requesting a flow smaller than the maximum flow, which causes the electronic displacement control to vary the flow of pressurized fluid.

20 Claims, 2 Drawing Sheets

HYDRAULIC CIRCUIT FOR RAPID BUCKET SHAKE OUT

TECHNICAL FIELD

The present disclosure relates generally to a hydraulic circuit, and, more particularly, to a hydraulic circuit used to rapidly shake material out of a machine bucket.

BACKGROUND

Construction machines such as, for example, dozers, loaders, excavators, motor graders, and other types of heavy machinery use a hydraulic circuit to operate a variety of actuators and associated implements. During operation of the construction machines, there may occasionally arise a need for rapid operation of the actuators to move the implements back and forth (i.e. to shake the implement). For example, an implement such as a bucket is often used for excavating earthen materials, and due to the adhesive nature of the materials, an operator may need to shake the bucket to adequately remove material that is stuck to or remains within the bucket. An operator may also shake the bucket to break into hard ground. Such shaking can be manually accomplished by a rapid back and forth movement of a lever controlling a valve associated with the actuators of the bucket, or it can be accomplished by a controller that automatically and rapidly cycles the valve.

The bucket actuators are moved by a working fluid supplied from a variable displacement pump having load-sensing control. A problem associated with type of pump is that it can respond slowly to demand. That is, the variable displacement mechanism inside the pump may adjust slowly to sudden demands for increased flow. On the other hand, these mechanisms may quickly adjust to a low flow-producing state upon the sudden cessation of demand for flow. This delay ill transition to full flow and subsequent rapid return to a low flow condition may cause problems when an actuator or implement must be moved rapidly back and forth, such as when an operator needs to shake a bucket. In such a situation, the pump may have difficulty responding quickly to demands to rapidly extend, stop, and then retract the bucket actuator.

Attempts have been made to improve performance during a bucket shaking operation of hydraulic circuits having a load-sensing, variable-displacement pump. For example, U.S. Pat. No. 5,235,809 (the ’809 patent), issued to Farrell on Aug. 17, 1993, discloses a hydraulic bucket shake circuit that allows rapid shaking of a bucket in response to an operator actuated switch. Upon activation of the switch, a directional control valve opens and sends a pilot pressure signal equivalent to a pump output pressure to a load-sensing input on an associated pump. This pilot pressure signal causes the load-sensing circuit to adjust the pump to maximum displacement, thereby allowing a rapid shaking of the bucket quicker than typical load-sensing pumps could otherwise respond.

Although the system disclosed in the ’809 patent may allow a rapid initial extension of a bucket actuator, such as during a bucket shaking operation, it may have limited applicability. Specifically, the ’809 system disables the variable displacement and load-sensing capabilities of the pump and, in doing so, turns the pump into a constant displacement pump displacing a maximum amount of fluid. This disabling may result in an inefficient system, because any excess fluid must be dumped directly to a tank, and the power used to pressurize the fluid is wasted. Additionally, the pressurized fluid being dumped across a relief valve to the tank may result in an undesired heating of the fluid, which may require a fluid cooling system, and/or prematurely degrade the quality and effectiveness of the fluid.

The disclosed hydraulic circuit is directed to overcoming one or more of the problems set forth above.

SUMMARY OF THE DISCLOSURE

A hydraulic circuit is disclosed. The hydraulic circuit may have a variable displacement pump configured to create a flow of pressurized fluid. The variable displacement pump may have a fluidic displacement control configured to vary the flow of pressurized fluid based on a first fluid signal, and an electronic displacement control configured to vary the flow of pressurized fluid based on an electronic signal. The flow of pressurized fluid may be controlled by the one of the fluidic displacement control and the electronic displacement control that is requesting the smallest flow of pressurized fluid. The hydraulic circuit may also have a first control valve connected between an outlet of the pump and an input of the fluidic displacement control, and the first control valve may be configured to transmit the first fluid signal to the input of the fluidic displacement control. The hydraulic circuit may further have a controller operable in a shake out mode. The shake out mode may include directing pressurized fluid from the pump outlet to the input of the fluidic displacement control to cause the fluidic control to request a maximum flow of pressurized fluid, and transmitting the electronic signal to the electronic displacement control to cause the electronic displacement control to vary the flow of pressurized fluid.

Another aspect of the present disclosure is directed to a method for operating a hydraulic circuit. The method may include generating a flow of pressurized fluid. The method may also include transmitting a fluid signal to vary the rate of generating, and transmitting an electronic signal to vary the rate of generating. The method may further include controlling the generating based on the one of the fluid signal and the electronic signal which is requesting the smallest flow of pressurized fluid.

DETAILED DESCRIPTION

Figure 1:
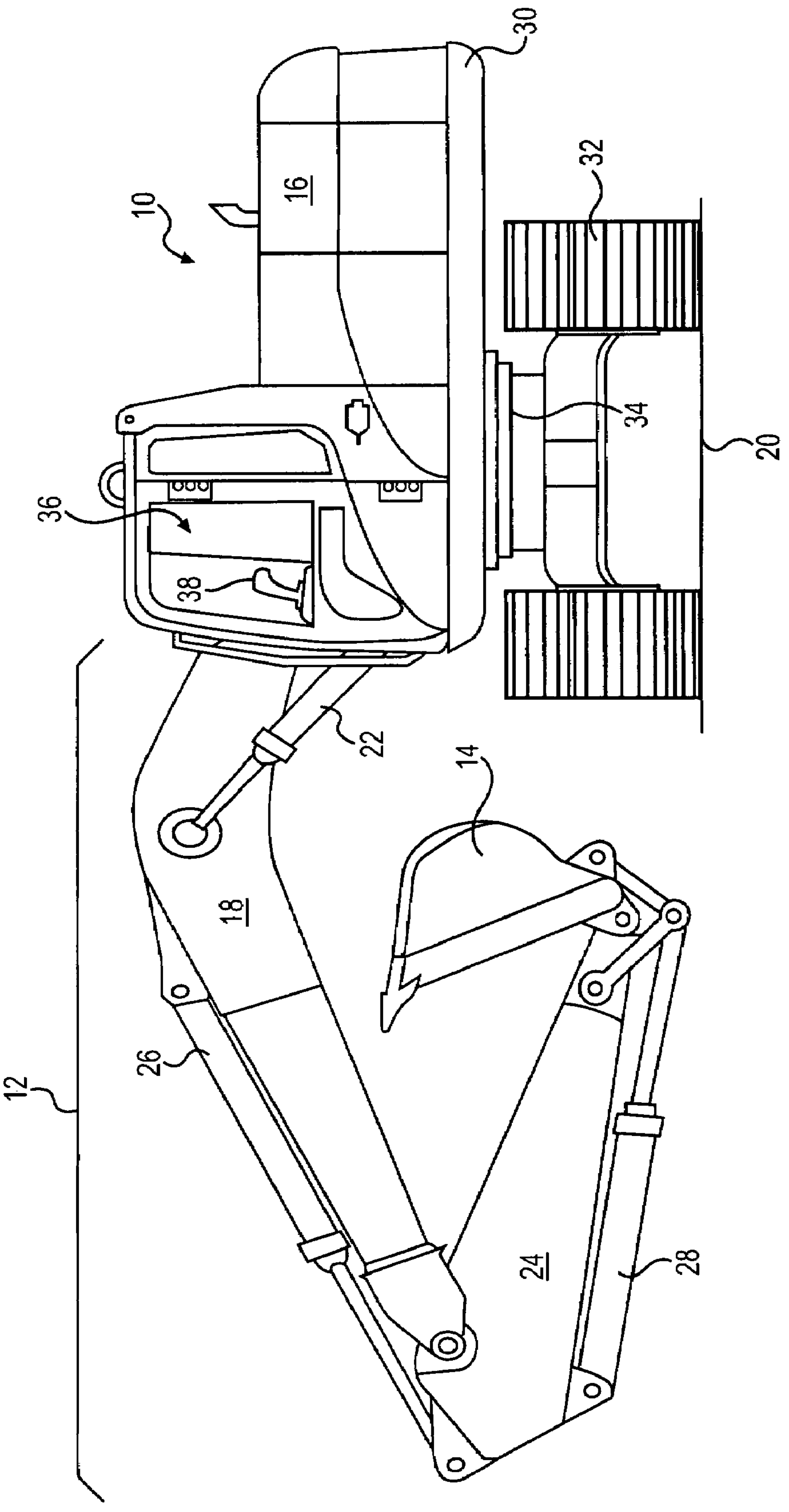
FIG. 1 is a pictorial illustration of an exemplary disclosed machine.

FIG. 1 illustrates an exemplary machine 10 having multiple systems and components that cooperate to accomplish a task. Machine 10 may embody a fixed or mobile machine that performs some type of operation associated with an industry such as mining, construction, farming, transportation, or any other industry known in the art. For example, machine 10 may be an earth moving machine such as the excavator depicted in FIG. 1. Alternatively, machine 10 may be a dozer, a loader, a backhoe, a motor grader, a haul truck, or any other earth-moving or task-performing machine. Machine 10 may include an implement system 12 configured to move a work tool 14, a power source 16 that drives implement system 12, and an operator station 36 for operator control of machine 10 and implement system 12.

Implement system 12 may include a linkage structure moved by fluid actuators to position and operate work tool 14. Specifically, implement system 12 may include a boom member 18 that is vertically pivotal about an axis relative to a work surface 20 by a pair of adjacent, double-acting, boom actuators 22 (only one shown in FIG. 1). Implement system 12 may also include a stick member 24 that is vertically pivotal about an axis in the same plane as boom member 18 by a single, double-acting, stick actuator 26. Implement system 12 may further include a single, double-acting, work tool actuator 28 operatively connected to work tool 14 to pivot work tool 14 in the vertical direction. Boom member 18 may be pivotally connected to a frame member 30 of machine 10, which may be pivoted in a transverse direction relative to an undercarriage 32 by a swing actuator 34. Stick member 24 may pivotally connect work tool 14 to boom member 18. It is contemplated that a greater or lesser number of fluid actuators may be included within implement system 12 and/or connected in a manner other than described above, if desired.

Numerous different work tools 14 may be attachable to a single machine 10 and controllable by an operator of machine 10. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot and swing relative to machine 10, work tool 14 may alternatively or additionally slide, rotate, lift, or move in any other manner known in the art in response to an operator input.

Power source 16 may produce a mechanical or electrical power output that may then be converted to hydraulic power for moving actuators 22, 26, 28 and 34. Specifically, power source 16 may embody an engine such as, for example, a diesel engine, a gasoline engine, a gaseous fuel-powered engine, or any other type of combustion engine known in the art. It is contemplated that power source 16 may alternatively embody a non-combustion source of power such as a fuel cell, an accumulator, or another source known in the art.

Operator station 36 may be configured to receive input from an operator indicative of a desired work tool and/or machine movement. Specifically, operator station 36 may include one or more operator interface devices 38 embodied as single or multi-axis joysticks located within proximity of an operator seat. Operator interface devices 38 may be proportional-type controllers movable between a neutral position and a maximum displaced position to move and/or orient work tool 14 at a desired work tool velocity. Likewise, the same or another operator interface device 38 may be movable between a neutral position and a maximum position to move and/or orient machine 10 relative to work surface 20 at a desired work machine velocity. As operator interface device 38 is moved between the neutral and maximum displaced positions, a corresponding interface device position signal may be generated indicative of the location. It is contemplated that different operator interface devices may alternatively or additionally be included within operator station 36 such as, for example, wheels, knobs, push-pull devices, switches, pedals, and other operator interface devices known in the art.

Figure 2:
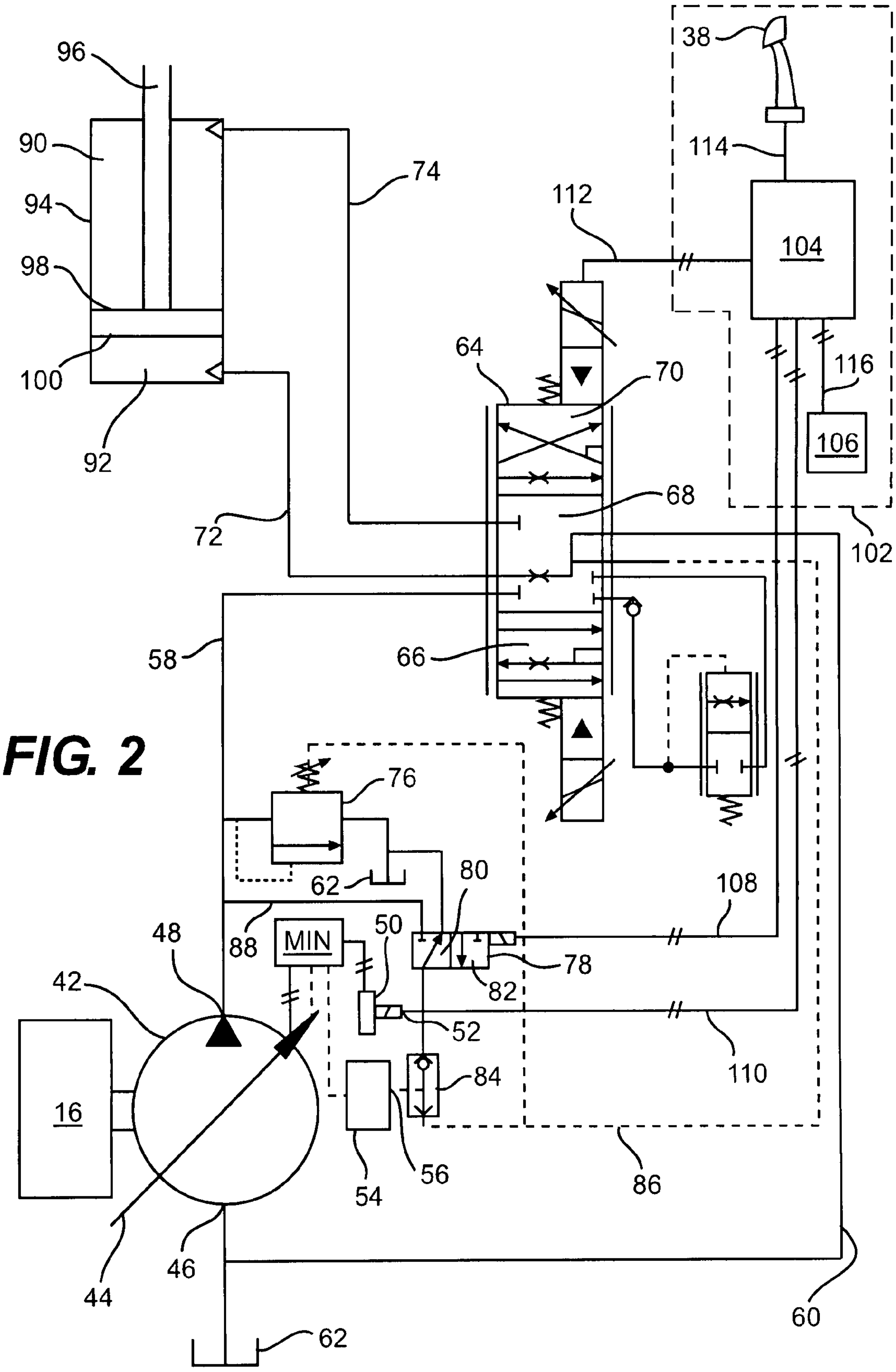
FIG. 2 is a schematic and diagrammatic illustration of an exemplary disclosed hydraulic system for use with the machine of FIG. 1.

As illustrated in FIG. 2, machine 10 may include a hydraulic system 40 having a plurality of fluid components that cooperate to move work tool 14. Specifically, hydraulic system 40 may include a tank 62 holding a supply of fluid, and a pump 42 configured to pressurize the fluid and direct the pressurized fluid to work tool actuator 28. Hydraulic system 40 may also include a relief valve 76, a LS valve 78, and a shuttle valve 84 that cooperate to control an output displacement of pump 42. Hydraulic system 40 may further include a control valve 64 configured to selectively direct pressurized fluid to work tool actuator 28. It is contemplated that hydraulic system 40 may include additional and/or different components such as, for example, makeup valves, pressure-balancing passageways, temperature sensors, position sensors, acceleration sensors, and other components known in the art.

Tank 62 may constitute a reservoir configured to hold a supply of fluid. The fluid may include, for example, a dedicated hydraulic oil, an engine lubrication oil, a transmission lubrication oil, or any other fluid known in the art. One or more hydraulic systems within machine 10 may draw fluid from and return fluid to tank 62. It is also contemplated that hydraulic system 40 may be connected to multiple, separate tanks. Tank 62 may receive fluid from hydraulic system 40 via return passageway 60, and/or via other return lines emanating from various other devices as described below.

Pump 42 may be connected to draw fluid from tank 62 via a suction inlet 46, and to pressurize the fluid to a predetermined level. Pump 42 may be drivably connected to power source 16 by, for example, a countershaft, belt, electrical circuit, or in any other suitable manner, such that an output rotation of power source 16 results in a pumping action of pump 42. Alternatively, pump 42 may be connected indirectly to power source 16 via a torque converter, a gear box, or in any other manner known in the art. Pump 42 may discharge pressurized fluid through a discharge outlet 48 and a supply passageway 58 to control valve 64. It is contemplated that multiple sources of pressurized fluid may be interconnected to supply pressurized fluid to hydraulic system 40, if desired.

Pump 42 may be a variable displacement pump having a swash plate 44 configured to vary the stroke of one or more pistons (not shown) associated with the pump, thereby varying the output displacement of the pump. By varying the angle of swash plate 44, pump flow may be increased or decreased, as desired. Pump 42 may also include a load-sense (LS) control 54 and an electro-proportional displacement (EP) control 50, each operable to control the angle of swash plate 44. LS control 54 and EP control 50 may cooperate such that the one of the two controls that requests the minimum flow from pump 42 may control the swash plate angle and, thereby, control the output of pump 42.

LS control 54 may include a LS port 56 configured to receive a LS signal from LS feedback passageway 86. LS control 54 may adjust the angle of swash plate 44 to maintain an outlet flow of pump 42 based on the LS signal. LS control 54 may adjust the angle of swash plate 44 to maintain a substantially constant pressure differential between the pump outlet pressure and the pressure at LS port 56. LS control 54 may adjust the angle of swash plate 44 until the desired pressure differential is achieved or until full output flow is obtained. For example, when implement system 12 is in operation, a pressure associated with work tool actuator 28 may operate against pump 42. This pressure may be fed back to LS port 56 from control valve 64 along LS feedback passageway 86, such that the swash plate angle may be adjusted, and the discharge flow associated with pump 42 varied in an attempt to maintain the substantially constant pressure differential. If the pressure at LS port 56 is about equal to the output pressure of pump 42, LS control 54 may attempt to adjust swash plate 44 such that it configures pump 42 to produce full displacement.

EP control 50 may include means commonly known in the art for adjusting the angle of swash plate 44, and thereby the output flow associated with hydraulic pump 42. EP control 50 may include for example, a solenoid, or any other similar device commonly known in the art. EP control 50 may receive an electronic signal indicative of the desired output displacement of pump 42 at EP port 52, and subsequently adjust the angle of swash plate 44 based on the electronic signal. One having ordinary skill in the art will recognize that the output flow associated with pump 42 may be controlled using the LS control 54, the EP control 50, or a combination thereof.

LS valve 78 may be a solenoid operated valve moveable between a first position 80 and a second position 82 to regulate the operation of pump 42. The input of LS valve 78 may be connected to supply passageway 58 via a LS pump pressure passageway 88. In the first position 80, LS valve 78 nay provide a fluid drain to tank 62, and allow for normal operation of LS control 54 and EP control 50. In the second position 82, LS valve 78 may provide a fluid path from pump 42 to LS port 56 via shuttle valve 84, to cause LS control 54 to request a maximum possible flow. It is contemplated that LS valve 78 may alternatively be hydraulically actuated, mechanically actuated, pneumatically actuated, or actuated in any other suitable manner. It is also contemplated that LS valve 78 may alternatively embody multiple valve elements configured to perform the same functions, if desired.

Shuttle valve 84 may be a two-way shuttle valve commonly known in the art, and used to fluidly connect LS port 56 with LS valve 78 and LS feedback passageway 86. Shuttle valve 84 may be configured to allow flow to LS port 56 from either LS valve 78 or LS feedback passageway 86, depending upon which has the higher pressure. Shuttle valve 84 may also prevent fluid from LS valve 78 from entering LS feedback passageway 86.

Relief valve 76 may be any normally closed, spring-loaded, pressure-piloted relief valve commonly known in the art. Relief valve 76 may be connected to supply passageway 58 and provide a pressure relief function for pump 42. When the discharge pressure of pump 42 exceeds a certain pressure, as determined by the pressure in LS feedback passageway 86, relief valve 76 may open and direct a flow of pressurized fluid from pump 42 to tank 62. When the discharge pressure of pump 42 is below the certain pressure, relief valve 76 may remain closed and allow the pressurized fluid from pump 42 to flow through supply passageway 58 to control valve 64.

Work tool actuator 28 may be configured to operate work tool 14. Work tool actuator 28 may include a tube 94 and a piston assembly 96 configured to form two separate pressure chambers. Work tool actuator 28 may contain a rod chamber 90 and a head chamber 92. Chambers 90 and 92 may be selectively supplied with pressurized fluid and drained of the pressurized fluid to cause piston assembly 96 to displace within tube 94, thereby changing the effective length of work tool actuator 28. The flow rate of fluid into and out of rod chamber 90 and head chamber 92 may relate to a velocity of work tool actuator 28, while a pressure differential between rod chamber 90 and head chamber 92 may relate to a force imparted by work tool actuator 28 on work tool 14. A head end passageway 72 may connect actuator control valve 64 to head chamber 92. A rod end passageway 74 may connect actuator control valve 64 to rod chamber 90.

Within work tool actuator 28, piston assembly 96 may include a first hydraulic surface 98, and a second hydraulic surface 100 disposed opposite first hydraulic surface 98. An imbalance of force caused by fluid pressure on first hydraulic surface 98 and second hydraulic surface 100 may result in movement of piston assembly 96 within tube 94. For example, a force on first hydraulic surface 98 being greater than a force on second hydraulic surface 100 may cause piston assembly 96 to displace to decrease the effective length of work tool actuator 28. Similarly, when a force on second hydraulic surface 100 is greater than a force on first hydraulic surface 98, piston assembly 96 may extend within tube 94 to increase the effective length of work tool actuator 28.

Control valve 64 may be a proportional, solenoid operated valve having an extend position 66, a neutral position 68, and a retract position 70, and be configured to regulate the motion of work tool actuator 28. In the extend position 66, control valve 64 may connect supply passageway 58 to head end passageway 72, and return passageway 60 to rod end passageway 74. In the neutral position 68, actuator control valve 64 may isolate work tool actuator 28 from pump 42. In the retract position 70, actuator control valve 64 may connect supply passageway 58 to rod end passageway 74, and return passageway 60 to head end passageway 72. Control valve 64 may be operated by actuating an associated solenoid. Control valve 64 may include a proportional spring biased valve mechanism that is biased to return to the neutral position 68 and is solenoid actuated to the extend position 66 and retract position 70. Control valve 64 may be movable to any position between the first, second, and third positions 66-70 to vary the rate of fluid flow into and out of work tool actuator 28, thereby affecting the velocity of piston assembly 96. Control valve 64 may be connected to LS feedback passageway 86 to provide a pressure control signal to LS port 56. It is contemplated that control valve 64 may alternatively be hydraulically actuated, mechanically actuated, pneumatically actuated, or actuated in any other suitable manner. It is also contemplated that control valve 64 may alternatively embody multiple valve elements configured to perform the same functions, if desired.

A control system 102 may monitor and adjust the performance of machine 10 and its components. In particular, control system 102 may include a sensor 106 in communication with a controller 104 via communication line 116. Controller 104 may also communicate with EP control 50 via a communication line 108, with LS valve 78 via a communication line 110, with control valve 64 via a communication line 112, and with operator interface device 38 via a communication line 114.

Sensor 106 may provide information to controller 104 that may be used to monitor and adjust the performance of machine 10 and its components. Sensor 106 is shown as a single sensor, but it is contemplated that sensor 106 may embody one or more sensors. For example, sensor 106 may embody a work tool position or velocity sensor, an actuator position or velocity sensor, a power source speed sensor, an operator input sensor associated with operator interface device 38, a pressure sensor associated with pressurized fluid driving work tool 14, a position sensor associated with control valve 64, and/or any other sensor associated with the performance, operation, and/or productivity of machine 10. Sensor 106 may communicate a measurement to controller 104 via communication line 116, and controller 104 may use the information from sensor 106 in any combination to monitor and adjust the performance of machine 10 and its components.

Controller 104 may embody a single microprocessor or multiple microprocessors that include a means for controlling an operation of machine 10. Numerous commercially available microprocessors can be configured to perform the functions of controller 104, and it should be appreciated that controller 104 could readily embody an Engine Control Module (ECM) and/or a general machine microprocessor capable of controlling numerous machine functions. Controller 104 may include a memory, a secondary storage device, a processor, and any other components for running an application. Various other circuits may be associated with controller 104, such as power supply circuitry, signal conditioning circuitry, data acquisition circuitry, signal output circuitry, signal amplification circuitry, and other types of circuitry known in the art.

It is also considered that controller 104 may include one or more maps stored within an internal memory of controller 104. Each of these maps may include a collection of data in the form of tables, graphs, and/or equations. Specifically, these maps m-ay correlate with selectable modes of operation, such as a normal mode, a shake out mode, and a neutral mode. Each mode map may include information that may be used to control various components of hydraulic system 40 based on a specific mode of operation (i.e. normal, shake out, or neutral). Each mode map may include data that may be used to control the position and operation of components of hydraulic system 40. The mode may be selected manually by an operator or automatically by controller 104 based inputs from sensor 106 and/or operator interface device 38.

In the default, or normal, operating mode, LS valve 78 may be hi the first position 80, and controller 104 may send a signal to EP control 50 through EP port 52 requesting a maximum pump output. Because, during normal operating conditions, LS control 54 may receive a control signal indicating a request for less than maximum flow from LS feedback passageway 86, LS control 54 may therefore be requesting a pump output less than that requested by EP control 50. This may result in LS control 54 controlling the output of pump 42. Pump 42 may then operate as a load-sensing, variable displacement pump, as is commonly known in the art. At LS port 56, LS control 54 may receive signals from various implements, valves, and/or actuators, such as control valve 64, indicative of a desired pump output that may determine the output flow of pump 42.

The shake out mode may allow hydraulic system 40 to respond more quickly for improved performance when rapid movement is desired. Controller 104 may enter shake out mode based on inputs from operator interface device 38. Controller 104 may enter the shake out mode based on movements of operator interface device 38. That is, a number of times operator interface device 38 is moved across a neutral, or zero, position within a certain period may signal controller 104 to enter the shake out mode. For example, if an operator moves operator interface device 38 across a neutral position three times within one second, controller 104 may enter the shake out mode. Controller 104 may remain in the shake out mode for a predetermined period or, alternatively, for as long as the signals from operator interface device 38 indicates that operation in the shake out mode is desired. Alternatively, operator interface device 38 may be a normally open switch that signals controller 104 to enter a shake out mode when the switch is closed. Controller 104 may then operate in shake out mode until the switch is opened.

In the shake out mode, LS valve 78 may be in second position 82, thereby sending a signal to LS port 56 equal to the output pressure of pump 42. This may cause LS control 54 to request that the pump provide maximum flow. Because controller 104 may send a signal to EP control 50 requesting an output of pump 42 less than the maximum output, EP control 50 may then control the output of pump 42. Controller 104 may send a signal to EP port 52 indicative of the desired pump output. Controller 104 may also control the rate at which the angle of swash plate 44 changes. In the absence of a specific request for an operation of hydraulic system 40, controller 104 may maintain a baseline flow of, for example, about fifty percent of pump 42 capacity, while in shake out mode. Controller 104 may also control the rate of change of the angle of swash plate 44 such that the rate of change of swash plate 44 during shake out mode is different than during normal mode. It is understood that the baseline flow of pump 42, while in shake out mode, may be set at any level an operator desires.

Controller 104 may also control the output of pump 42 in response to specific requests from, for example, operator interface device 38. Using data contained in the maps, and inputs from sensor 106, controller 104 may alter the output of pump 42 and the position of control valve 64 in response to inputs from operator interface device 38. For example, an operator may rapidly move operator interface device 38 to shake work tool 14. Upon receiving a signal from operator interface device 38 indicative of a request to rapidly move work tool 14, controller 104 may signal EP control 50 to increase the output of pump 42 above the baseline flow, if necessary, to provide the flow required to move work tool 14 in the desired manner. Controller 104 may also control the rate of change of the output displacement of pump 42 such that the angle of swash plate 44 changes slowly or not at all during rapid back and forth movement of work tool 14. This may allow pump 42 to provide the flow required to move work tool 14, without an associated delay in response due to oscillation of the angle of swash plate 44.

The neutral mode may allow hydraulic system 40 to provide a minimum amount of flow to improve hydraulic system response. Controller 104 may enter the neutral mode when all control valves, such as, for example, control valve 64, have been in their neutral positions for a predetermined period, and when no input from operator interface device 38 has been received for the predetermined period. In the neutral mode, hydraulic circuit may be configured and operate similar to shake out mode. That is, LS valve 78 may be in second position 82, thereby sending a signal to LS port 56 equal to the output pressure of pump 42. This may cause LS control 54 to request that the pump provide maximum flow. Because controller 104 may send a signal to EP control 50 requesting an output of pump 42 less than the maximum output, EP control 50 may then control the output of pump 42. Controller 104 may send a signal to EP port 52 indicative of the desired pump output. In neutral mode, controller 104 may use EP control 50 to request a predetermined minimum flow from pump 42, for example, twenty-five percent. Controller 104 may remain in neutral mode until at least one of several conditions is satisfied. First, controller 104 may exit neutral mode and return to normal mode if, for a second predetermined time, the control valves, such as, for example, control valve 64, remain in neutral, and there are no inputs from operator interface device 38. Second, controller 104 may exit the neutral mode and return to normal mode if, before the second predetermined time, a request for an operation is received from operator interface device 38 and/or a control valve is moved from its neutral position such that a requested flow rate is above the predetermined minimum flow provided by the neutral mode. Third, controller 104 may exit the neutral mode if controller 104 detects a request to enter the shake out mode, in which case controller 104 may enter the shake out mode.

INDUSTRIAL APPLICABILITY

The disclosed hydraulic circuit may be applicable to any machine that includes a hydraulic actuator where efficiency and rapid response of hydraulic actuators are important. The disclosed hydraulic circuit may allow a load-sensing pump to operate at a minimum displacement when there is no demand for pressurized fluid. The disclosed hydraulic circuit may also allow the pump to provide an increased, sustained flow necessary for rapid implement movement by using electro-proportional displacement control. The operation of hydraulic system 40 will now be explained.

Work tool actuator 28 may be moveable by pressurized fluid in a variety of different modes and in response to an operator input from operator interface device 38. Specifically, pump 42 may draw fluid from tank 62, pressurize the fluid, and direct the fluid through supply passageway 58 to control valve 64. Controller 104 may send a signal to control valve 64 indicative of an operator's desired movement of work tool actuator 28, causing control valve 64 to direct pressurized fluid into either head chamber 92 or rod chamber 90 of work tool actuator 28. This flow of pressurized fluid into head chamber 92 or rod chamber 90 may cause the effective length of work tool actuator 28 to change, in turn causing the attached work tool 14 to move. Control valve 64 may feed back a fluid pressure signal to LS port 56 through LS feedback passageway 86, thereby causing LS control 54 to adjust the output displacement of pump 42.

When the operator desires to move work tool 14 rapidly back and forth, the operator may signal controller 104 to operate in shake out mode. The operator may indicate a desire for operation in shake out mode by manipulating operator interface device 38 in such a manner as to signal controller 104 that shake out mode is desired. For example, the operator may rapidly move operator interface device 38 across the neutral position three times in one second. Once in shake out mode, controller 104 may signal LS valve 78 to move to second position 82. This may send a flow of pressurized fluid from discharge outlet 48 to LS port 56, thereby causing LS control 54 to request that pump 42 provide maximum displacement. This request for maximum displacement from LS control 54 may be more than the displacement requested from EP control 50 via a signal from controller 104. This may result in EP control 50 controlling the output displacement of pump 42, based on a signal from controller 104.

In the shake out mode, controller 104 may use the maps stored in memory to determine a baseline output displacement of pump 42. For example, controller 104 may determine, based on an input from operator interface device 38, that EP control 50 should adjust pump 42 to provide an output displacement of about 50% of maximum. In this way, the output displacement of pump 42 may be sufficient to allow rapid back and forth movement of work tool actuator 28, while avoiding excessive inefficiencies, including pumping and heat losses, that may result if pump 42 were producing 100% displacement. Additionally, when operating at 50% of capacity, pump 42 may be able to more quickly increase output to 100%, thereby reducing response time when compared to a pump that must adjust from 0% to 100% capacity.

EP control 50 and the shake out mode of operation may provide benefits over a pump having only a LS control 54. The pump may be controlled by LS control 54 during normal operation, providing the benefit of increased efficiency commonly associated with load-sensing variable displacement pumps. But in an instance where the rapid movement of hydraulic actuators requiring large pump displacements is desired, a shake out mode may place the pump under EP control, which may allow more precise control of the pump displacement. In addition, EP control may control a rate of change of the angle of swash plate 44, thereby providing increased responsiveness to operator inputs. This increased responsiveness may, in turn, allow for more rapid back and forth movement of work tool 14, which may more effectively remove material from work tool 14. Rapid movement of a work tool 14 may also be useful for breaking into hard ground.

It will be apparent to those skilled in the art that various modifications and variations can be made to the disclosed hydraulic circuit without departing from the scope of the disclosure. Other embodiments of the hydraulic circuit for shake out will be apparent to those skilled in the art from consideration of the specification and practice of the hydraulic circuit for shake out disclosed herein. It is intended that the specification and examples be considered as exemplary only, with a true scope of the disclosure being indicated by the following claims and their equivalents.

What is claimed is:

1. A hydraulic circuit, comprising:
- a variable displacement pump configured to create a flow of pressurized fluid and having:
  - a fluidic displacement control configured to vary the flow of pressurized fluid based on a first fluid signal; and
  - an electronic displacement control configured to vary the flow of pressurized fluid based on an electronic signal, wherein the flow of pressurized fluid is controlled by the one of the fluidic displacement control and the electronic displacement control that is requesting the smallest flow of pressurized fluid;
- a first control valve connected between an outlet of the pump and an input of the fluidic displacement control, the first control valve being configured to transmit the first fluid signal to the input of the fluidic displacement control; and
- a controller operable in a shake out mode to:
  - direct the first fluid signal in the form of pressurized fluid from the pump outlet to the input of the fluidic displacement control to cause the fluidic control to request a maximum flow of pressurized fluid; and
  - transmit the electronic signal to the electronic displacement control to cause the electronic displacement control to vary the flow of pressurized fluid.

2. The hydraulic circuit of claim 1, further including an operator input device configured to transmit a mode signal to the controller indicative of a desire for operation in the shake out mode.

3. The hydraulic circuit of claim 2, wherein the mode signal is transmitted after the operator input device is moved across a neutral position a predetermined number of times within a predetermined period.

4. The hydraulic circuit of claim 2, further including:
- a hydraulic actuator having a first chamber and a second chamber and being moveable by the flow of pressurized fluid; and
- a second control valve fluidly connecting the pump outlet, the first chamber, and the second chamber, the second valve being configured to:
  - move in response to operation of the input device;
  - selectively direct pressurized fluid to the hydraulic actuator; and
  - transmit a second fluid signal to the input of the fluidic displacement control.

5. The hydraulic circuit of claim 4, further including a work tool connected to the hydraulic actuator.

6. The hydraulic circuit of claim 4, further including a shuttle valve fluidly connected to the input of the fluidic displacement control, the first control valve, and the second control valve, the shuttle valve being configured to transmit to the input of the fluidic displacement control the one of the first and second fluid signals having the higher pressure.

7. The hydraulic circuit of claim 4, further including a pressure relief valve connected to the pump outlet and having a relief setting determined by the second fluid signal.

8. A method for operating a hydraulic circuit, comprising:
- generating a flow of pressurized fluid;
- transmitting a fluid signal to vary the rate of generating;
- transmitting an electronic signal to vary the rate of generating; and controlling the generating based on the one of the fluid signal and the electronic signal which is requesting the smallest flow of pressurized fluid.

9. The method of claim 8, wherein the fluid signal is indicative of a request for a maximum possible flow of pressurized fluid.

10. The method of claim 9, wherein the fluid signal is indicative of the pressure of the pressurized fluid.

11. The method of claim 9, wherein the electronic signal requests a flow of pressurized fluid greater than a minimum flow of pressurized fluid.

12. The method of claim 11, wherein the electronic signal is indicative of a user-generated demand for a flow of pressurized fluid.

13. The method of claim 8, further including using the flow of pressurized fluid to rapidly operate a work tool.

14. The method of claim 8, wherein:

the electronic signal is indicative of a request for a maximum possible flow of pressurized fluid; and the fluid signal is indicative of a user-generated demand for a flow of pressurized fluid.

15. A hydraulic machine, comprising:

a power source;

a variable displacement pump driven by the power source to create a flow of pressurized fluid and having:

a fluidic displacement control configured to vary the flow of pressurized fluid based on a first fluid signal; and an electronic displacement control configured to vary the flow of pressurized fluid based on an electronic signal, wherein the flow of pressurized fluid is controlled by the one of the fluidic displacement control and the electronic displacement control which is requesting the smallest flow of pressurized fluid;

a first control valve connected between an outlet of the pump and an input of the fluidic displacement control, the first control valve being configured to transmit the first fluid signal to the input of the fluidic displacement control;

a controller operable in a shake out mode to:

direct the first fluid signal in the form of pressurized fluid from the pump outlet to the input of the fluidic displacement control to cause the fluidic control to request a maximum flow of pressurized fluid; and transmit the electronic signal to the electronic displacement control to cause the electronic displacement control to vary the flow of pressurized fluid;

a hydraulic actuator having a first chamber and a second chamber and being moveable by the flow of pressurized fluid;

a second control valve fluidly connecting the pump outlet, the first chamber, and the second chamber, the second valve being configured to:

move in response to operation of the input device;

selectively direct pressurized fluid to the hydraulic actuator;

transmit a second fluid signal to the input of the fluidic displacement control; and a work tool connected to the hydraulic actuator.

16. The hydraulic machine of claim 15, further including an operator input device configured to transmit a mode signal to the controller indicative of a desire for operation in the shake out mode.

17. The hydraulic machine of claim 16, wherein the mode signal is transmitted after the operator input device is moved across a neutral position a predetermined number of times within a predetermined period.

18. The hydraulic machine of claim 16, wherein the input device is a normally open switch and the mode signal is transmitted after the normally open switch is closed.

19. The hydraulic machine of claim 15, further including:

a shuttle valve fluidly connected to the input of the fluidic displacement control, the first control valve, and the second control valve, the shuttle valve being configured to transmit to the input of the fluidic displacement control the one of the first and second fluid signals having the higher pressure; and a pressure relief valve connected to the pump outlet and having a relief setting determined by the second fluid signal.

20. The hydraulic machine of claim 15, wherein the work tool is a bucket connected to the hydraulic actuator, the work tool being configured to handle a bulk material.

* * * * *